March 31, 1931. A. R. SIMON 1,798,856
ADJUSTABLE VISOR
Filed Dec. 7, 1925
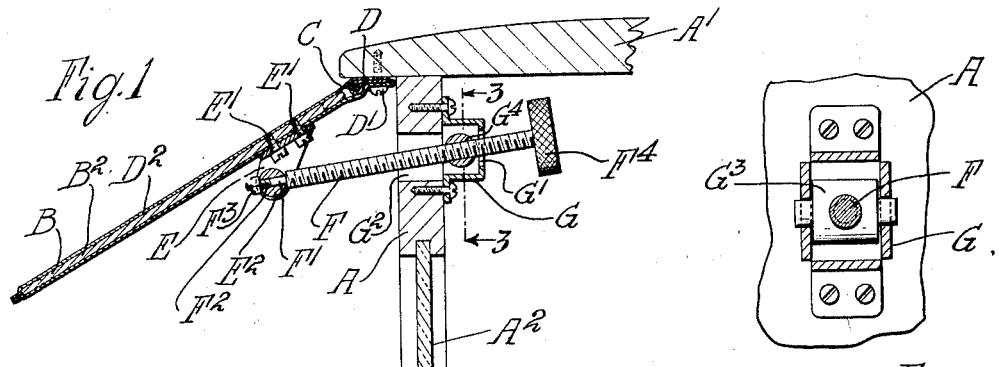
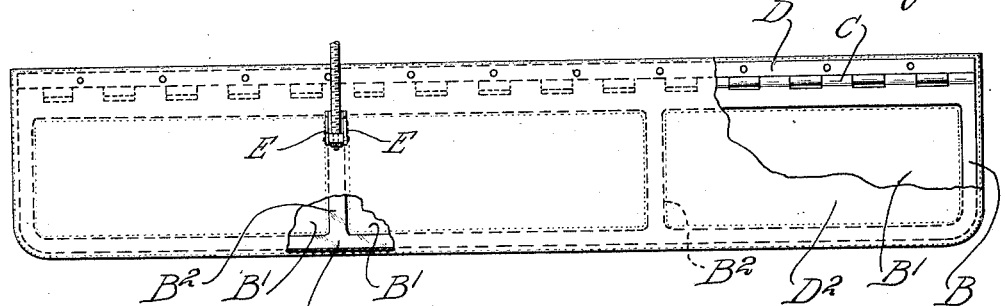
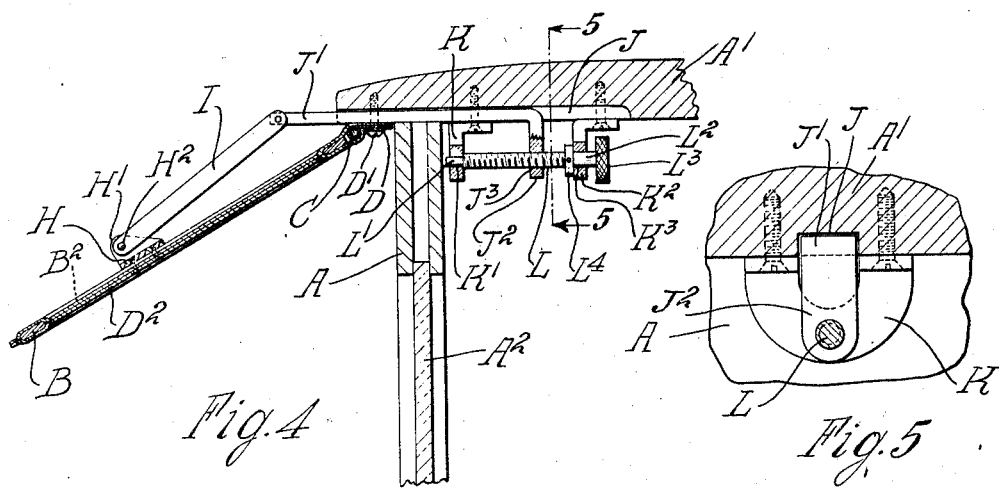
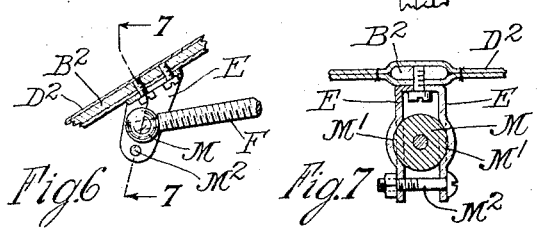
Inventor
Arthur R. Simon
by Parker & Carter
Attorneys.

Patented Mar. 31, 1931

1,798,856

UNITED STATES PATENT OFFICE

ARTHUR R. SIMON, OF LA PORTE, INDIANA

ADJUSTABLE VISOR

Application filed December 7, 1925. Serial No. 73,625.

This invention relates to an automobile visor, that is to say to a visor or projecting shield adapted preferably to be mounted on an automotive vehicle and to extend in front of the top or covering of such vehicle. It may be applied to a vehicle having a normally closed body in which case it will usually be mounted on the roof of the body or it may be applied to a vehicle having a folded or demountable body in which case it will usually be mounted on the wind shield or wind shield support.

One object of the invention is to provide an adjustable visor which may be mounted on the vehicle body and which may readily be raised and lowered. Another object is to provide in connection with such an adjustable visor means for supporting it and adjusting it without the necessity of stopping the vehicle or reaching outside of the vehicle body to make the adjustment. Other objects will appear from time to time throughout the specification and claims.

My invention is illustrated more or less diagrammatically in the accompanying drawings, wherein:

Figure 1 is a fragmentary vertical cross section showing one form of the invention in position on the automobile body;

Figure 2 is a plan view of the visor with parts in section;

Figure 3 is a cross section on an enlarged scale taken on line 3—3 of Figure 1 showing a part of the adjusting attachment;

Figure 4 is a view similar to Figure 1 showing a modified form;

Figure 5 is a cross section taken on line 5—5 of Figure 4.

Figure 6 is a modified attachment for the adjusting screw of Figure 1.

Figure 7 is a vertical section on an enlarged scale of line 7—7 of Figure 6.

A is a portion of the body frame. $A^1$ is the roof of the body. $A^2$ is the glass or wind shield in front of the body.

B is the visor frame. It is formed as shown with a plurality of openings $B^1$ and provided with a number of internal cross member $B^2$. It is provided along its rear edge with a long hinge C of the type generally described as a "piano hinge". By means of the hinge the visor is adjustably joined to an attaching strip D which is fastened to the roof $A^1$ of the vehicle body by means of screws, rivets or other attaching members $D^1$. The visor frame has a covering $D^2$ of any suitable weatherproof material.

One of the cross members $B^2$ has fastened to it a pair of ears E. These ears may be integral with each other or may be separately made. They are preferably removably fastened to the cross member $B^2$ by means of screws $E^1$ $E^1$. Journaled between the ears E is a rocking or pivotal bearing $E^2$ which is provided with perforations. F is an adjusting screw. At one end of it is a reduced portion $F^1$ which lies within the perforation of the member $E^2$. The reduced portion $F^1$ is threaded at its outer end as at $F^2$ and an attaching nut $F^3$ is screwed onto it. At its other end the screw F has a knurled thumb nut $F^4$ by means of which it may be rotated to carry out the adjustment of the parts.

G is a housing mounted on the inside of the body and secured to the frame member A. It is provided with a perforation $G^1$ and is preferably mounted over a perforation $G^2$ in the body frame A. Within the housing G is journaled a rocking or pivotal bearing $G^3$ which is provided with a threaded hole $G^4$ through which the screw F passes.

In the modified form shown in Figures 4 and 5 the construction of the visor itself is the same as that above described. The details of the adjusting mechanism are slightly different and will now be described.

Mounted preferably on one of the cross members $B^2$ is a member H provided with a pair of upturned ears $H^1$ between which a short shaft $H^2$ is mounted. Mounted on this shaft and adapted to rotate about it is a connecting link I. The roof portion $A^1$ of the body is provided with a cut-out or channel portion J. In this lies a movable member $J^1$. This is joined at its outer end to one end of the link member I, is downwardly bent at its rear as at $J^2$, the portion $J^2$ being provided with a threaded perforation $J^3$. Fastened to the roof $A^1$ of the body and within the body is a bearing member K which is provided with a perforation $K^1$. A corresponding bearing member $K^2$ is mounted opposite the first member and it also is provided with a perforation $K^3$ which is preferably larger than the perforation $K^1$ and in alignment with it.

L is an adjusting screw provided at one end with a reduced portion $L^1$ which is mounted for rotation in the perforation $K^1$. At its upper end it is provided with a smooth portion $L^2$ which lies within the perforation $K^3$ of the member $K^2$. At its outer end the adjusting screw is provided with a knurled thumb nut $L^3$. $L^4$ is a spacing member mounted on the adjusting screw and is held in proper relation to the bearing parts.

Although I have shown an operative device, still it will be obvious that many changes might be made in size, shape and arrangement of parts without departing materially from the spirit of my invention; and I wish, therefore, that showing be taken as in a sense diagrammatic.

The use and operation of my invention are as follows:

When the device is to be used in connection with an automobile body, a perforation is cut through the front of the frame either directly through the front of the frame or through roof of the body so that an opening is provided from the outside to the inside through the front portion of the body. The attaching strip is fastened to the outside of the front of the body roof member and the visor is thus in position on the body. The member which holds the adjusting screw within is then mounted in position within the body, and the adjusting screw which is mounted in this member extends outward through the hole in the front of the body and is fastened to the visor. Rotation of the adjusting screw moves the strip in and out and thus raises and lowers the visor.

In the form shown in Figures 4 and 5 the assembly of the parts is generally the same as that above described except that the adjusting screw itself does not extend beyond the body. The movable member $J^1$ is the member which extends outward through the opening in the front of the body and engages the link which is itself attached to the visor. Thus rotary movement of the adjusting screw moves the member $J^1$ in and out and thus raises and lowers the visor. In Figures 6 and 7 a modified form of attachment for the outer end of the adjusting screw F is shown. In this form a ball M is used instead of the member $E^2$ and the ears E are provided with inwardly facing depressions $M^1$ which together serve as a socket for the ball M. A bolt $M^2$ is provided so that the ears may be drawn together to adjust the tension on the bolt.

I claim:

In combination with an automobile body and an adjustable visor including a hinge between the inner side of said visor and the vehicle body, of means for raising and lowering the visor, including a bearing pivotally mounted within the body and provided with a threaded opening through it, a member having a threaded portion extending through and engaging the threads of said opening and a universal joint connection between the outer end of said member and said visor, one element of said universal joint being formed with a bearing to rotatably support the outer end of said member.

Signed at Detroit, county of Wayne, and State of Michigan, this 18th day of November, 1925.

ARTHUR R. SIMON.